Aug. 23, 1966   H. E. WAGNER   3,268,035
FLUID-OPERATED CONE BRAKE
Filed Oct. 19, 1964   3 Sheets-Sheet 1

INVENTOR
HAROLD E. WAGNER
BY Rommel, Allwein and Rommel
ATTORNEYS

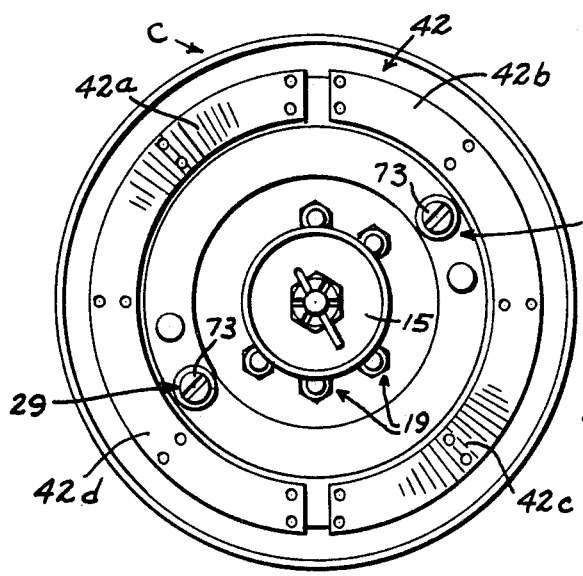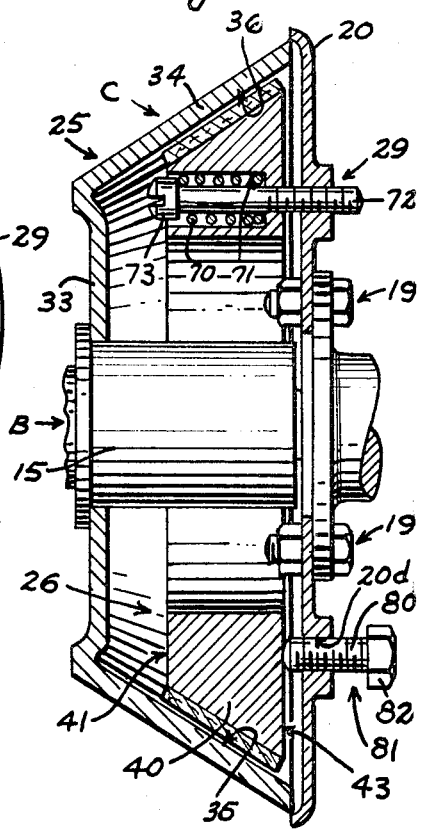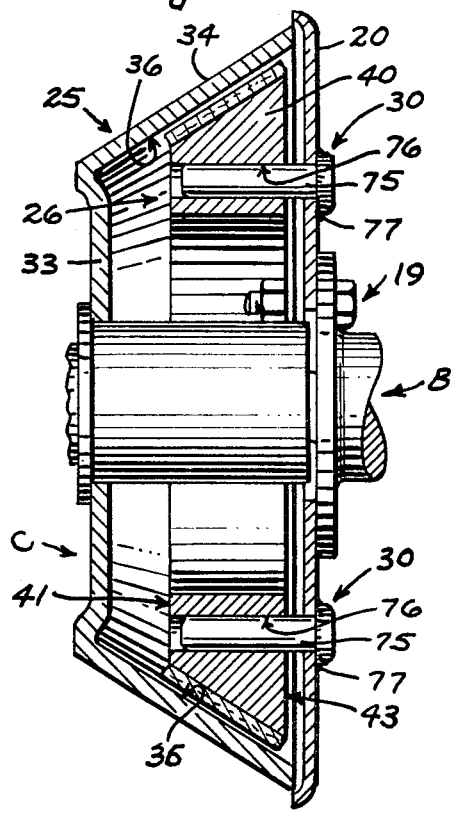

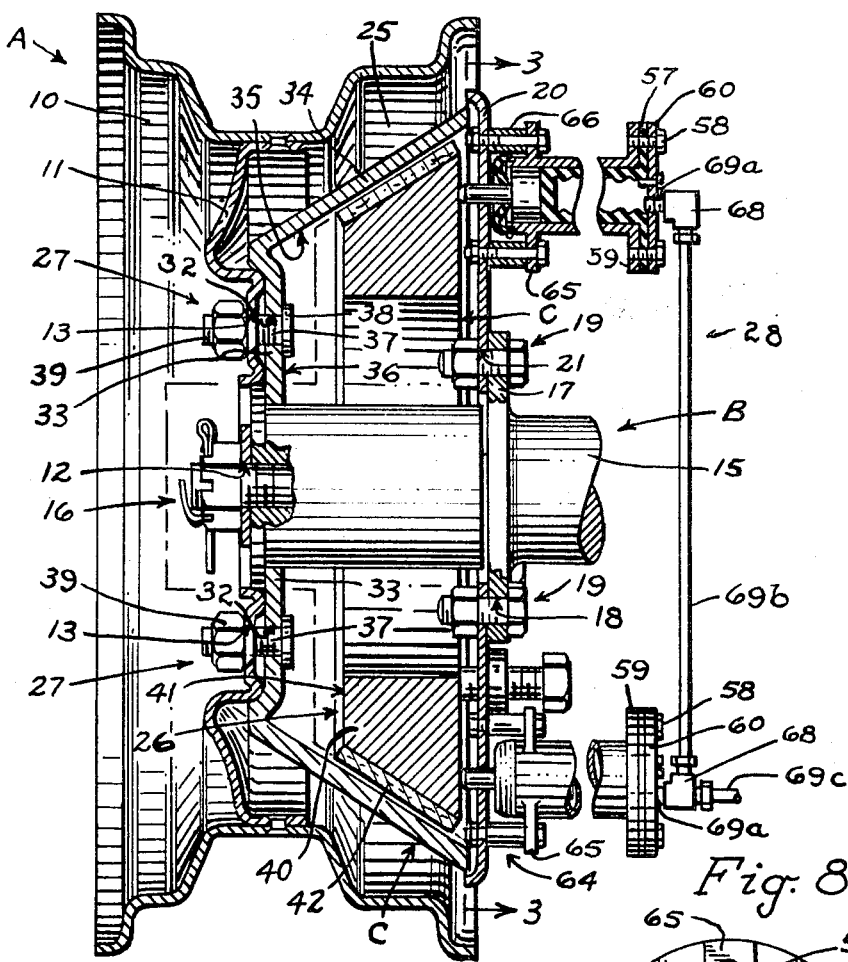
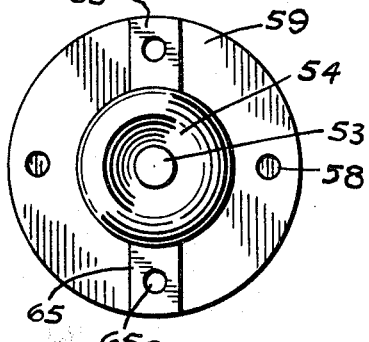
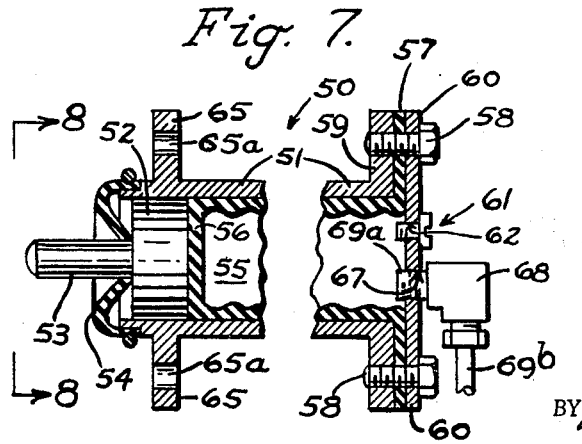

United States Patent Office 3,268,035
Patented August 23, 1966

3,268,035
FLUID-OPERATED CONE BRAKE
Harold E. Wagner, 1561 Lindaire Lane, Mansfield, Ohio
Filed Oct. 19, 1964, Ser. No. 404,642
3 Claims. (Cl. 188—71)

This invention relates to brakes and more particularly to improvements in cone brakes.

An important object of the invention is to provide cone brakes in which the brake components are relatively small in number for efficient braking operations, and simple in construction, thus reducing the cost of manufacture and assembly and reducing the number of parts which may become broken and require repairs or replacement.

Another important object of the invention is to provide sturdy cone brakes for use on modern cars and trucks. Particularly sturdy cone brakes which provide a positive braking action which may be adjusted to cars and trucks of various weights and operating velocities.

Another important object of the invention is to provide cone brakes which may be employed in connection with various means for operating them.

Additionally, an important object of the invention is to provide cone brakes which are easy to install and service.

Other objects and advantages of the invention will be apparent during the course of the following detailed description of the invention, taken in connection with the accompanying drawings, forming portions of this disclosure and in which drawings:

FIG. 3 is an elevational view of the opposite face of the back plate of the cone brake of FIG. 1, but on a scale reduced over that of FIG. 1, and taken substantially on the line 3—3 of FIG. 4.

FIG. 4 is a vertical sectional view of the cone brake and wheel of FIG. 1, substantially on the line 4—4 of FIG. 1.

FIGS. 5 and 6 are vertical sectional views of the back plate of FIG. 1, substantially on their respective section lines of FIG. 1.

FIG. 7 is a fragmentary vertical sectional view of a piston-and-cylinder assembly of FIG. 1, but on an enlarged scale.

FIG. 8 is a vertical face view substantially on the line 8—8 of FIG. 7.

Figure 1:
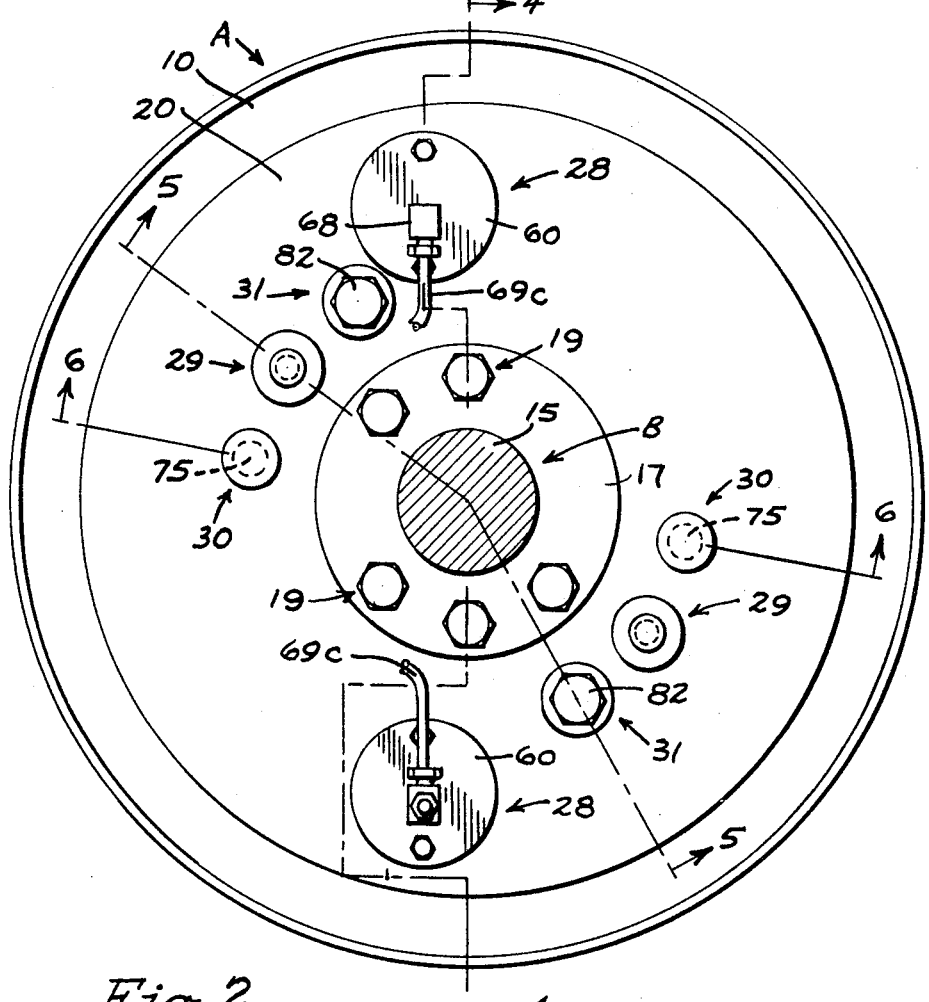
FIG. 1 is an elevational view of one face of a back plate of the cone brake of this invention, with a portion of a wheel extending beyond the horizontal plane of the back plate.

In the drawings wherein for the purpose of illustration is shown a preferred embodiment of the invention, and wherein similar reference characters designate corresponding parts throughout the several views, the letter A may generally designate a wheel; B, an axle assembly for the wheel A; C, the preferred form of the cone brake.

The wheel A is shown, by way of example, as a conventional vehicle wheel, with a rim portion 10 and a support portion 11 for the rim. The support portion 11 may be a disc having a central opening 12 for receiving a portion of conventional means 16 for securing together the wheel A and axle assembly B, and a plurality of spaced-apart openings 13 spaced outwardly of the central opening and concentric therewith, for the accommodation of portions of means 30 for connecting a portion of the cone brake C to the support portion 11, as will be later described.

Supporting the wheel A is an axle assembly B which preferably comprises the axle 15, conventional means 16 to secure the outer end portion thereof to the wheel A at the opening 12 in the support portion 11, and a flange 17 extending outwardly from the axle 15 and provided with openings 18 for means, such as the bolt shanks of nut-and-bolt assemblies 19, for securing a back plate 20 to the flange 17, as shown in FIG. 4. This back plate 20 is a rigid disc-like member, having openings 21 axially aligned with the openings 18 for portions of the bolt shanks of the assemblies 19, and provided with other openings for the accommodation of portions of the cone brake C and its operating means, as will be subsequently described.

The cone brake C comprises an outermost truncated conical member 25 and an innermost truncated conical member 26, with attaching means 27, operating means 28, adjusting means 29, guide means 30, and abutment means 31.

FIGS. 4, 5 and 6 show the outermost truncated conical member 25, having a truncated conical peripheral wall 34 joined at its end of least circumference to an end wall 33, but the end of greatest circumference is open. The inner face 36 of the wall 34 provides a brake band or lining-contacting face.

FIG. 4 discloses means 27 for fixedly attaching the member 25 to the support portion 10 of the wheel A, which means may be nut-and-bolt assemblies with the shanks 37 of the assemblies extending through axially aligning openings 32 in the end wall 33 of the member 25, and through the openings 13 in the portion 11, with the heads 38 of the bolts bearing against the innermost face of the end wall 33 and the nuts 39 tightened upon the support-portion 11.

The truncated conical member 26 of the cone brake C has a truncated conical peripheral wall 40, preferably open at its ends and is provided with an outer face 41 adapted to carry a brake band 42. FIG. 3 discloses a preferred arrangement of the brake band as composed of a plurality of segments 42$^a$, 42$^b$, 42$^c$ and 42$^d$ (FIG. 3), applied to the face 41 and secured, in any approved way, as by rivets, to the wall 40. The wall 40 is preferably solid and of aluminum or its alloys, and provides a rear face or surface 43 and a body wide enough for tapping therethrough for the accommodation of brake elements as will be detailed.

Referring mainly to FIGS. 1, 4, 7 and 8, the brake operating means 28, includes a plurality of piston-and-cylinder assemblies 50. In the example shown, there are two such assemblies, preferably spaced apart substantially as shown in FIG. 1. Each, as may be seen in FIGS. 4 and 7, is provided with a cylinder 51 containing a piston head 52 which terminates in an outwardly extending projection 53, the longitudinal axis of the projection being coincident with that of the head. The outer ends of the projections may be convex and are adapted to contact the rear face 43 of the peripheral wall 40; but is free of connection therewith. The projection slides through an axially-disposed opening in a cylinder head or closure 54 which is of rubber or other material and is adapted to exclude foreign matter to the cylinder's chamber. This head or closure 54 may be retained in place by an approved means, such as a conventional ring clamp, adhesive or interior screw threads in the head or closure for cooperation with exterior screw threads at the outer end portion of the cylinder 51. The chambers of the cylinders 51 slidably accommodate the side walls of pocketed cylindrical accordion diaphragms 55 provided with end walls adapted for face contact with the inner end faces of the piston heads 52, as may be seen in FIGS. 4 and 7. The portions of the pocketed diaphragms opposite the end walls thereof may be outwardly flanged as at 57 and have perforations to accommodate the screw-threaded shanks of screws 58 for clamping the flanges between outwardly extending flanges 59 of the cylinders and closures 60 at the ends of the cylinders opposite the head or closure 54. Each of these closures 60 is provided with a conventional fluid bleeder regulator 61, which may be a screw with its shank in screw-threaded engagement with the screw thread of an opening 62 in the closure 60.

A preferred ratio for the inside diameter of the cylinder 51 and its length is 1:2.

Figure 2:
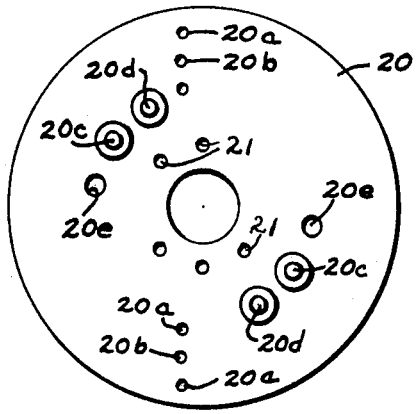
FIG. 2 is an elevational view of the face of the back plate of the cone brake of FIG. 1, on a smaller scale and with portions of the brake mechanism removed.

Means 64 for supporting the piston-and-cylinder assemblies 50 may be peripheral ears 65 adjacent the end of each cylinder 51 nearest the closure 54, which ears may be provided with bolt shank-accommodating openings 65$^a$ for shanks which also extend through suitable shims or hollow spacer 66 and through aligning openings 20$^a$ (FIG. 2) in the back plate 20 as shown in FIG. 4, where the end portion of the shank receives a suitable nut. The outer ends of the projections 53 slidably extend through suitable openings 20$^b$ (FIG. 2) in the back plate also.

For permitting the entry and exhaust of volumes of fluid to and from the cylinders, I provide an opening 67 (FIG. 7) in the closed 60, preferably screw threaded, to receive a conventional coupling means, such as an elbow 68, coupled to a pipe section 69$^a$ which is provided with exterior screw threads mating with those of the wall of the opening 67, and one elbow also opening to a fluid conduit or pipe section 69$^b$ which is a conventional part of fluid braking systems such as employed in automobiles, trucks and the like. Each elbow also opens to the by-pass pipe section 69$^c$. Fluid pressure through the conduits (two in the example shown), the elbow 68 and pipe section 69$^a$ will enter the cylinders 51 and cause the diaphragms to expand, pressing the end wall 56 against the piston head 52 which will move toward the head or closure 54 and force the projection 53 to, in turn, force the innermost truncated conical member toward the outermost truncated conical member 25 so that the brake band 35 will contact the wall 34 and cause a braking action upon the wheel A. Reverse flow of the fluid will cause the pressure of the projections 53 to be released and the innermost truncated member 26 will move away from the member 25, releasing the brake. Such movement will be accomplished as will now be explained.

Referring mainly to FIGS. 1, 3 and 5, means 29 to retract the truncated conical member 26 after it has been advanced by the means 28, are provided. In the example shown, there are two means 29 and each comprises an expansion coil spring 70, disposed within a recess 71 extending into the wall 40 of the innermost truncated conical member 26, the mouth of which opens to the outer face 41 thereof, with the spring retained upon adjusted tension by an adjusting screw 72 which extends through the spring 70, slidably through the wall 40, through an opening 20$^c$ (FIG. 2) in the back plate 20 and in screw threaded engagement with screw threads of the wall of the back plate, substantially as shown in FIG. 5. The head 73 of the screw 72 abuts the outer end of the spring 70.

Guide means 30 for guiding the innermost truncated conical member 26 in paths paralleling the rotative axis of the axle 15 are best shown in FIG. 6, where two of the means 30 are shown, by way of example. Each comprises a pin 75 extending through an opening 76 in the peripheral wall 40, with the inner end portion of the pin carried by the back plate 20, being preferably welded thereto, as at 77. Each pin extends through an opening 20$^e$ (FIG. 2) in the back plate 20. The member 26 slides back and forth upon the pins 75 which have intimate contact with the walls of the openings 76 but permit the back-and-forth play without binding.

Abutment means 31 for limiting the rearward movement of the truncated conical member 26 toward the back plate 20 are shown in FIGS. 1 and 5. In FIG. 1 it will be noted that two such means are provided, spaced substantially 180° apart, and FIG. 5, shows one of the two means in detail. Each with its screw-threaded shank 80 extending through an opening 20$^d$ in the back plate 20. The opening 20$^d$ is screw threaded to mate with the screw threads of the shank 80. It is preferred that the free end of the shank be rounded. The head 82 of the set screw may be manipulated without removing the member 26 from the back plate, as is obvious in FIG. 5

Separation of the wheel A from the axle 15 of the axle assembly B will carry, with the wheel, the outermost truncated conical member 25 of the brake C, whereby access may be had to the slotted heads 73 of the adjusting screws 72 or to the nuts 39, as well as to permit renewal of the brake band or lining 35.

The provision of the brake operating means 28 with their specific diaphragms 55, prevents the loss of braking fluid, since the fluid fills only the pockets of the diaphragms, and cannot escape around the piston head 52.

By positioning the cylinder 51 wholly rearwardly of the back plate 20, as in FIG. 4, the braking fluid within the cylinder 51 is not affected by the heat of braking, as would be the case were the cylinder confined between the truncated conical member 40 and the back plate 20.

The brake C is adapted for use with various fluids, including air and hydraulic fluids.

Various changes in the size, shape and arrangement of parts may be made to the form of invention herein shown and described, without departing from the spirit of the invention or scope of the claims.

What is claimed is:

1. A fluid pressure-actuated cone brake for a rotatable member fixedly mounted upon an axle, said brake including an outermost truncated conical member having a friction means contacting face; means for fixedly attaching said outermost truncated conical member to said rotatable member to rotate therewith for braking said rotatable member, an innermost truncated conical member slidably mounted upon said axle to move longitudinally thereof and having friction means for contacting said face upon sliding of said innermost truncated conical member upon said axle toward said outermost truncated conical member, and with said friction means contacting said face; a non-rotatable back plate fixedly mounted upon said axle with said back plate inwardly of said innermost truncated conical member and provided with a perforation spaced from the axis of rotation of said axle, and having a face facing rearwardly away from said innermost truncated conical member; fluid pressure actuated means carried by said back plate and functioning upon application of fluid pressure thereto to move said innermost truncated conical member so that said friction means will contact said face to brake said rotatable member, said fluid pressure actuated means including a cylinder and cylindrical piston and a rigid projection extending outwardly from said piston and slidably extending through said perforation, means detachable securing said cylinder to said back plate to extend wholly rearwardly of said back plate, whereby said piston and cylinder being wholly outwardly of said back plate will be free of the heat of braking confined between said back plate and innermost truncated conical member; retraction means carried by said back plate and said innermost truncated conical member to retract said innermost truncated conical member upon release of fluid pressure; limiting means carried by said back plate for limiting the retraction of said innermost truncated conical member away from said outermost truncated conical member upon release of said pressure; and guide means carried by said back plate for guiding said innermost truncated conical member toward and away from said outermost truncated conical member.

2. A fluid pressure-actuated cone brake according to claim 1 characterized in that said piston has an inner face, said cylinder has an outwardly-extending flange at the end thereof spaced farthest from said back plate, and said cylinder contains a cylindrical-shaped diaphragm having an end wall in face contact with said face of said piston and has a cylindrical wall in face contact with the inner face of said cylinder, and with the end portion of said diaphragm, opposite said end wall, fixedly secured to said cylinder at said flange.

3. A fluid pressure-actuated cone brake according to claim 1 characterized in that said back plate and innermost truncated conical member each has an opening extending therethrough, with the openings being axially aligned and said guide means comprises a rigid pin extending through said openings in said back plate and said innermost truncated conical member and welded to said face of said back plate, with the periphery of said pin slidably contacting the wall of said innermost truncated conical member with said innermost truncated conical member slidably carried thereby, the longitudinal axis of said pin being parallel with the longitudinal axis of said axle and axis of said piston.

References Cited by the Examiner

UNITED STATES PATENTS

| 1,701,237 | 2/1929 | Justice et al. | 188—71 |
| 2,001,599 | 5/1935 | Cohen | 188—71 |
| 2,170,893 | 8/1939 | Gallup | 188—71 |
| 2,430,936 | 11/1947 | Kraft | 192—66 X |
| 2,465,560 | 3/1949 | Warnke | 92—92 X |
| 3,187,850 | 6/1965 | Russell | 92—92 X |

FOREIGN PATENTS

| 58,478 | 9/1911 | Switzerland. |
| 346,777 | 7/1960 | Switzerland. |

MILTON BUCHLER, *Primary Examiner.*

G. E. A. HALVOSA, *Assistant Examiner.*